United States Patent [19]

Kobayashi et al.

[11] 4,105,546

[45] Aug. 8, 1978

[54] METHOD OF TREATING WASTE WATER WITH ACTIVATED SLUDGE

[75] Inventors: Yasushi Kobayashi; Minoru Iwata, both of Himeji; Sadao Yoshida, Ichihara; Hisashi Akatuka, Himeji, all of Japan

[73] Assignee: Idemitsu Kosan Company, Ltd., Tokyo, Japan

[21] Appl. No.: 729,174

[22] Filed: Oct. 4, 1976

Related U.S. Application Data

[63] Continuation-in-part of Ser. No. 590,061, Jun. 25, 1975, abandoned.

[30] Foreign Application Priority Data

Jun. 29, 1974 [JP] Japan .................................. 49-74698

[51] Int. Cl.² .............................................. C02C 1/06
[52] U.S. Cl. ........................................ 210/11; 210/15; 210/18

[58] Field of Search ......................................... 210/2-9, 210/11, 15, 18

[56] References Cited

U.S. PATENT DOCUMENTS

| 3,152,983 | 10/1964 | Davis et al. ............................. 210/11 |
| 3,291,729 | 12/1966 | Martin .................................... 210/18 |
| 3,565,796 | 2/1971 | Levin ...................................... 210/18 |
| 3,723,255 | 3/1973 | Walden et al. ......................... 210/15 |

FOREIGN PATENT DOCUMENTS

2,528,522   1/1976   Fed. Rep. of Germany ............. 210/18

*Primary Examiner*—Charles N. Hart
*Assistant Examiner*—Peter A. Hruskoci
*Attorney, Agent, or Firm*—Flynn & Frishauf

[57] ABSTRACT

Waste waters, including those containing an oil, are treated with activated sludge and a hydrocarbon having from 4 to 20 carbon atoms per molecule or a hydrocarbon fraction containing the same.

5 Claims, 1 Drawing Figure

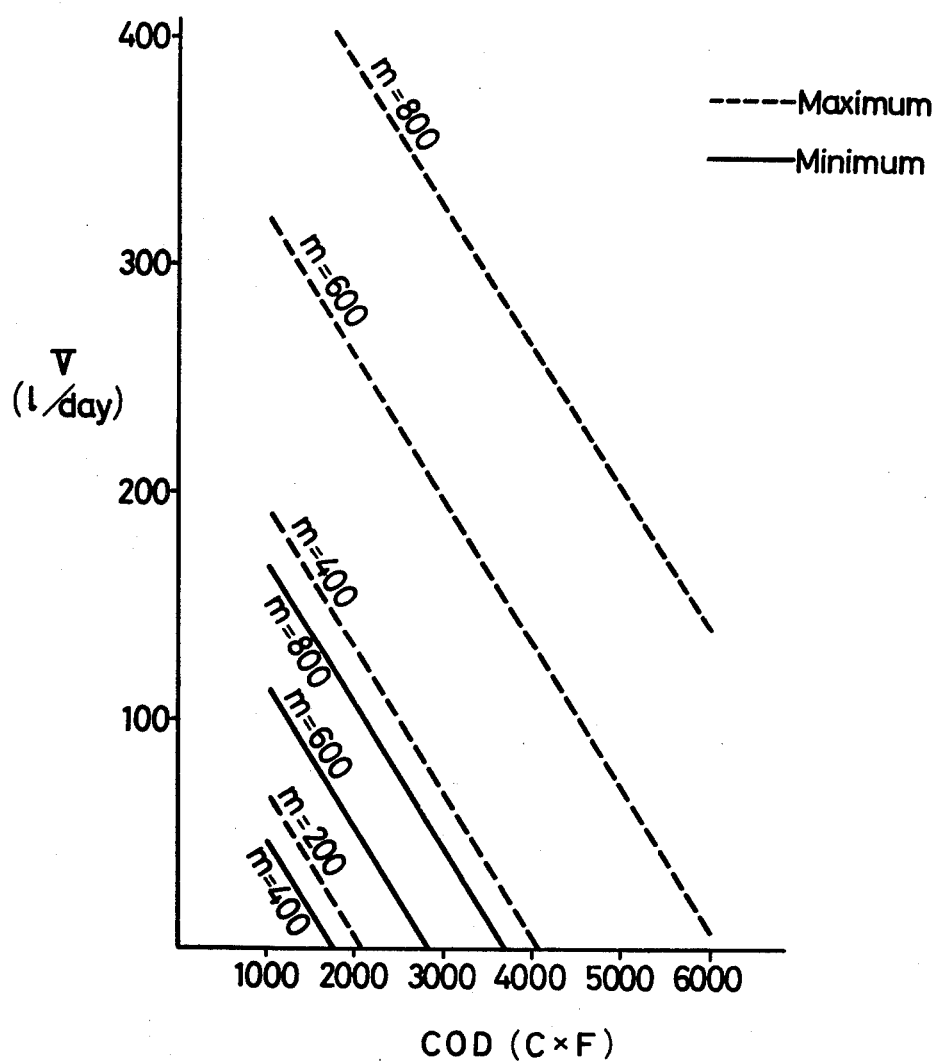

METHOD OF TREATING WASTE WATER WITH ACTIVATED SLUDGE

CROSS-REFERENCE TO OTHER APPLICATION

This application is a continuation-in-part of our co-pending application Ser. No. 590,061 filed on Jun. 25, 1975 now abandoned.

FIELD OF THE INVENTION

This invention relates to a method of treating a waste water with activated sludge.

PRIOR ART

In conventional treatments of waste waters with activated sludge, a proper range of Biological Oxygen Demand (BOD) — sludge loading in a waste water is an important problem. But in the case of a waste water from purification of petroleum, BOD loading of a waste water (i.e., raw water) is normally extremely low. Therefore, unless a proper substrate source is supplied, the velocity of extinction or oxidative decomposition of activated sludge becomes high compared with its proliferation velocity, and it is impossible to maintain a concentration of activated sludge within a definite range. And in such case, sedimentation of the activated sludge is impaired and it is difficult to obtain a desired treated water.

For these reasons, dextrose, methanol, ethyl acetate, etc., have previously been added to a raw water for the purpose of adjusting loading and balance of a substrate and metabolic nutrition source in a raw water. These substances are relatively excellent in assimilation by microorganisms, but not sufficient as substrate sources not only because they are expensive, but also because their structures or properties are significantly different from those of ingredients polluting waste waters in the case of oil-containing waste waters such as those from petroleum purification. That is, these substances may be useful to maintain the concentration of microorganisms in sludge, but they are disadvantageous in that the activity on the oil ingredients is low depending on the change of the biological phase.

SUMMARY OF THE INVENTION

We have developed an improved waste water treating method with activated sludge. We have found that it is possible to treat a waste water, preferably without requiring a heterogeneous substrate source, by adding a hydrocarbon or hydrocarbon fraction from mineral oil in a proper quantity to a waste water, especially in treating an oil-containing waste water. That is, the method of the present invention comprises adding a hydrocarbon from mineral oil to a waste water in treating a waste water with activated sludge.

SPECIFIC EMBODIMENTS OF THE INVENTION

As to oil-containing waste waters treated by the method of this invention, the waste waters can contain crude oil or fraction thereof including a volatile oil, naphtha, kerosene, light oil, heavy oil, etc., or can be an individual hydrocarbon thereof.

A hydrocarbon from mineral oil used in the present invention contains from 4 to 20 carbon atoms per molecule. In particular, a kerosene fraction or a naphtha fraction is preferable. As naphtha fractions, light naphtha (boiling point: 30°–110° C.), heavy naphtha (boiling point: 110°–190° C.) and full range naphtha (boiling point: 30°–190° C.) are available and suitable. Full range naphtha contains hydrocarbons having 4 to 11 carbon atoms; its specific gravity is from 0.70 to 0.75. Kerosene contains hydrocarbons of 8–16 carbon atoms; its boiling point is 150°–270° C. and its specific gravity 0.78–0.80.

The addition of a hydrocarbon may be either directly to an aeration tank containing a waste water, or to the waste water prior to the introduction of the water into the aeration tank. This addition may be done either continuously or intermittently (for instance, every 8–12 hours). The amount of added hydrocarbon should satisfy the following formula, depending upon COD (Chemical Oxygen Demand) in a waste water, in the case of continuous operation:

$$6.25 \times 10^{-5} \times m \times T - 6 \times 10^{-2} \times C \times F > V > 2.75 \times 10^{-5} \times m \times T - 6 \times 10^{-2} \times C \times F$$

wherein:
- $V$ = amount of added hydrocarbon (liters per day)
- $m$ = concentration of activated sludge (ppm)
- $T$ = capacity of aeration tank (m$^3$)
- $C$ = COD concentration in waste water (ppm)
- $F$ = flow rate of waste water (m$^3$/hr.)

The above formula is an empirical formula which we have developed for determining the proper range of COD loading on an activated sludge and calculating COD conversion constant of a mineral oil hydrocarbon. In the case of a batch process, it is preferable to add the amount per day calculated from the above formula in increments at intervals during a prescribed time period.

The above formula is expressed by the following formula when capacity of aeration tank (T) is 1000 m$^3$.

$$0.0625m - 6 \times 10^{-2} \times C \times FF > V > 0.0275m - 6 \times 10^{-2} \times C \times F$$

The accompanying figure shows, on the basis of the above formula, the relation among various concentrations of activated sludge, COD per unit time (C $\times$ F), and the minimum and maximum values of the amount of hydrocarbon oil to be added. Activated sludge can be managed in a preferred state by adding hydrocarbon within the range determined by the formula. In case the amount of hydrocarbon added is less than the required minimum amount calculated from the above formula, it is difficult to maintain the concentration of activated sludge and thus self-oxidation, etc., occur. Whereas, in case the added amount exceeds the maximum determined from the formula, hydrocarbon is adsorbed excessively into the activated sludge and disadvantages result; for instance, the hydrocarbon acts as a solvent on lipids present in the activated sludge.

In performing the present invention, an average residence time of waste water in an aeration tank is not restrictive, but generally is from about 7 to about 20 hours, and concentration of the activated sludge in an aeration tank is from about 1000 to about 8000 ppm, preferably 2000–6000 ppm.

When a hydrocarbon or hydrocarbon fraction is added according to the method of the present invention, decrease of respiratory activity velocity of the activated sludge after adding hydrocarbon is rapid and assimilation stability is superior to that of glucose, ethyl acetate, etc., which are conventionally used as substrates. Therefore, in treating an oil-containing waste water, the hydrocarbon preferably acts as a substrate source for the activated sludge and is useful for proliferation of the sludge. Moreover, the hydrocarbon substrate is acclimated with the result that the activated sludge repeats the uptake of the substrate and, in addition, improves the activity on oil ingredients in the waste water due to a preferable change of biological phase.

On the other hand, as the hydrocarbon acts as a solvent on an oil or sludge-containing oil with a high fluidizing point (for instance, heavy oil or wax), the hydrocarbon improves the contact of such an oil with the activated sludge and greatly contributes to advance oil adsorption by the activated sludge.

Furthermore, though it has been absolutely unexpected, foaming in an aeration tank is inhibited as a result of adding a proper amount of the hydrocarbon, and sedimentation of sludge in a sedimentation tank is facilitated.

As shown so far, the normal management of an activated sludge can be done according to the method of the present invention, although an oil ingredient in a waste water is substantially increased. Thus, a waste water can be treated continuously in a stable state.

In performing the present invention, it is possible to improve on reducing BOD or COD value in a treated water or to accelerate flocculation velocity of an activated sludge in a sedimentation tank by adding sea-water, for instance, so that the total salt concentration in a waste water after the addition of sea-water is from about 0.3 to about 0.5 weight percent. In addition, in case hydrogen sulfide or other sulfide such as mercaptane, disulfide, cyclic sulfide, etc., is contained in a waste water, the treatment of the sulfide can be done at the same time by adding an oxidizing agent such as chlorine dioxide as well as an iron catalyst in conventional quantities.

The present invention is illustrated in the following examples, which are not to be construed as limitations.

EXAMPLE 1

Oil-containing waste waters of various COD concentrations, to which a predetermined amount of kerosene was added, were charged to an aeration tank with a capacity of 1000 m$^3$ at a predetermined flow rate and contacted with an activated sludge consisting of various biological phases (zooglea, epistylis and vorticella are contained as major microorganisms) previously adjusted to a predetermined sludge concentration.

The analytical results of treated waters discharged from the sedimentation tank employed in this example are shown in Table 1. The results were obtained as a result of determinations made after approximately 1 day of operation.

Table 1

| (F) m$^3$/hr | (m) ppm | (C) ppm | *1 $V_{max}$ 1/day | *2 $V_{min}$ 1/day | (V) 1/day | COD of Treated Water ppm | Oil Ingredient of Treated Water ppm | Suspended Solid of Treated Water ppm |
| --- | --- | --- | --- | --- | --- | --- | --- | --- |
| 50  | 6100 | 41 | 258 | 45  | 66  | 7.6 | 0.7 | 6.5 |
| 50  | 5900 | 38 | 255 | 48  | 109 | 6.8 | 0.6 | 5.0 |
| 60  | 7250 | 51 | 270 | 16  | 134 | 8.4 | 0.8 | 6.7 |
| 100 | 7050 | 33 | 242 | <0  | 115 | 7.2 | 0.7 | 8.1 |
| 120 | 4880 | 33 | 67  | "   | 18  | 7.5 | 0.7 | 7.5 |
| 80  | 4530 | 48 | 54  | "   | 31  | 6.2 | 0.5 | 4.8 |
| 55  | 4000 | 65 | 36  | "   | 26  | 7.5 | 0.7 | 5.3 |

F = flow rate of waste water
m = concentration of activated sludge
C = COD concentration in waste water
V = amount of added Kerosene
*1 Maximum amount of Kerosene which is calculated by the formula
*2 Minimum amount of Kerosene which is calculated by the formula

COMPARATIVE EXAMPLE 1

The process of Example 1 was repeated, except that the amount of added kerosene was not satisfied the above-described formula. The analytical results of the treated waters are shown in Table 2.

Table 2

| (F) m$^3$/hr | (m) ppm | (C) ppm | *1 $V_{max}$ 1/day | *2 $V_{min}$ 1/day | (V) 1/day | COD of Treated Water ppm | Oil Ingredient of Treated Water ppm | Suspended Solid of Treated Water ppm |
| --- | --- | --- | --- | --- | --- | --- | --- | --- |
| 25  | 8100 | 20 | 476 | 193 | 6   | 12.1 | 1.4 | 24.0 *3 |
| 20  | 8860 | 30 | 518 | 208 | 8   | 14.6 | 2.0 | 38.1 *3 |
| 50  | 7000 | 15 | 392 | 148 | 26  | 10.6 | 1.5 | 19.8 |
| 50  | 5530 | 18 | 292 | 98  | 14  | 12.9 | 1.3 | 21.0 *3 |
| 40  | 7110 | 22 | 392 | 143 | 37  | 10.7 | 1.0 | 15.3 |
| 60  | 6550 | 24 | 323 | 94  | 21  | 8.4  | 0.8 | 8.1 |
| 75  | 8080 | 39 | 330 | 47  | 10  | 8.7  | 0.8 | 7.7 |
| 95  | 6100 | 39 | 159 | <0  | 193 | 8.6  | 0.8 | 6.9 |
| 95  | 7010 | 48 | 165 | "   | 215 | 11.0 | 1.8 | 12.0 |
| 95  | 5020 | 42 | 74  | "   | 135 | 12.1 | 2.5 | 21.8 *4 |
| 100 | 2950 | 25 | 34  | "   | 82  | 11.1 | 2.0 | 15.0 *4 |
| 100 | 2730 | 21 | 45  | "   | 100 | 13.2 | 1.9 | 16.3 |
| 90  | 2400 | 38 | 0   | "   | 8   | 13.3 | 1.3 | 20.1 |

Table 2-continued

| (F) m³/hr | (m) ppm | (C) ppm | *1 $V_{max}$ 1/day | *2 $V_{min}$ 1/day | (V) 1/day | COD of Treated Water ppm | Oil Ingredient of Treated Water ppm | Suspended Solid of Treated Water ppm |
|---|---|---|---|---|---|---|---|---|
| 90 | 2550 | 40 | 0 | " | 24 | 14.5 | 1.2 | 10.9 |

F = flow rate of waste water
m = concentration of activated sludge
C = COD concentration in waste water
V = amount of added kerosene
*1 Maximum amount of Kerosene which is calculated by the formula
*2 Minimum amount of Kerosene which is calculated by the formula
*3 "bulking" The phenomena of mixing the sludge into the treated water due to difficulty in sedimentation of the expanded sludge.
*4 "abundant oil film"

EXAMPLE 2

The process of Example 1 was repeated, except that a full range naphtha was used instead of kerosene. The analytical results of the treated waters are shown in Table 3.

Table 3

| (F) m³/hr | (m) ppm | (C) ppm | *1 $V_{max}$ 1/day | *2 $V_{min}$ 1/day | (V) 1/day | COD of Treated Water ppm | Oil Ingredient of Treated Water ppm |
|---|---|---|---|---|---|---|---|
| 130 | 5600 | 30.6 | 112 | <0 | 40 | 6.5 | 0.7 |
| 120 | 5890 | 38.2 | 93 | " | 40 | 6.8 | 0.8 |
| 140 | 7580 | 33.5 | 192 | " | 10 | 7.2 | — |

F = flow rate of waste water
m = concentration of activated sludge
C = COD concentration in waste water
V = Added amount of full range Naphtha
*1 Maximum amount of Naphtha which is calculated by the formula
*2 Minimum amount of Naphtha which is calculated by the formula

COMPARATIVE EXAMPLE 2

The process of Example 1 was repeated, except that predetermined amounts of ethyl acetate were used instead of a hydrocarbon fraction. The analytical results of the treated waters are shown in Table 4.

Table 4

| Flow Rate m³/hr | Concentration of Activated Sludge (ppm) | Added Amount of Ethyl Acetate (1/day) | COD of Waste Water (ppm) | COD of Treated Water (ppm) | Oil Ingredient of Treated Water (ppm) |
|---|---|---|---|---|---|
| 80 | 5750 | 50 | 33.5 | 10.0 | 0.9 |
| 75 | 6250 | 50 | 59.7 | 10.1 | 0.9 |
| 80 | 6690 | 50 | 29.0 | 8.6 | 2.1 |
| 65 | 5890 | * | 30.5 | 9.2 | 1.8 |

*glucose, 30 kg/day

It is to be understood that the parameters and equipment conventionally used in activated sludge processes for treating waste waters can be used in the method of this invention.

What is claimed is:

1. A method of treating an oil-containing waste water with an activated sludge in an aeration tank which comprises adding a mineral oil hydrocarbon to the waste water in an amount satisfying the formula:

$$6.25 \times 10^{-5} \times m \times T - 6 \times 10^{-2} \times C \times F > V > 2.75 \times 10^{-5} \times m \times T - 6 \times 10^{-2} \times C \times F$$

wherein $V$ is the amount of added hydrocarbon in liters per day; $m$ is concentration of from about 1000 to about 8000 ppm of the activated sludge, $T$ is capacity of the aeration tank in which the waste water is so treated in 1000 cubic meters per flow rate $F$; $C$ is Chemical Oxygen Demand concentration of from about 30 to about 65 ppm in the waste water; and $F$ is flow rate of the waste water of from about 50 to about 140 cubic meters per hour of the waste water; and wherein the hydrocarbon is a hydrocarbon fraction containing hydrocarbons having from 4 to 20 carbon atoms per molecule, aerating the mixture of waste water, mineral oil hydrocarbon, and activated sludge for a time effective in reducing said chemical oxygen demand, and passing said mixture to a sedimentation tank to produce a settled sludge and treated waste water.

2. A method according to claim 1, wherein the hydrocarbon is a kerosene fraction or a naphtha fraction.

3. A method according to claim 1, wherein an average residence time of the waste water in the aeration tank is from about 7 to about 20 hours.

4. A method according to claim 1, wherein the hydrocarbon is a kerosene fraction.

5. A method according to claim 1, wherein the hydrocarbon is a naphtha fraction.

* * * * *